Feb. 12, 1929.  1,702,007
R. L. JACKSON
POWER DRIVEN BRUSH FOR MEAT BLOCKS
Filed June 14, 1927   2 Sheets-Sheet 2
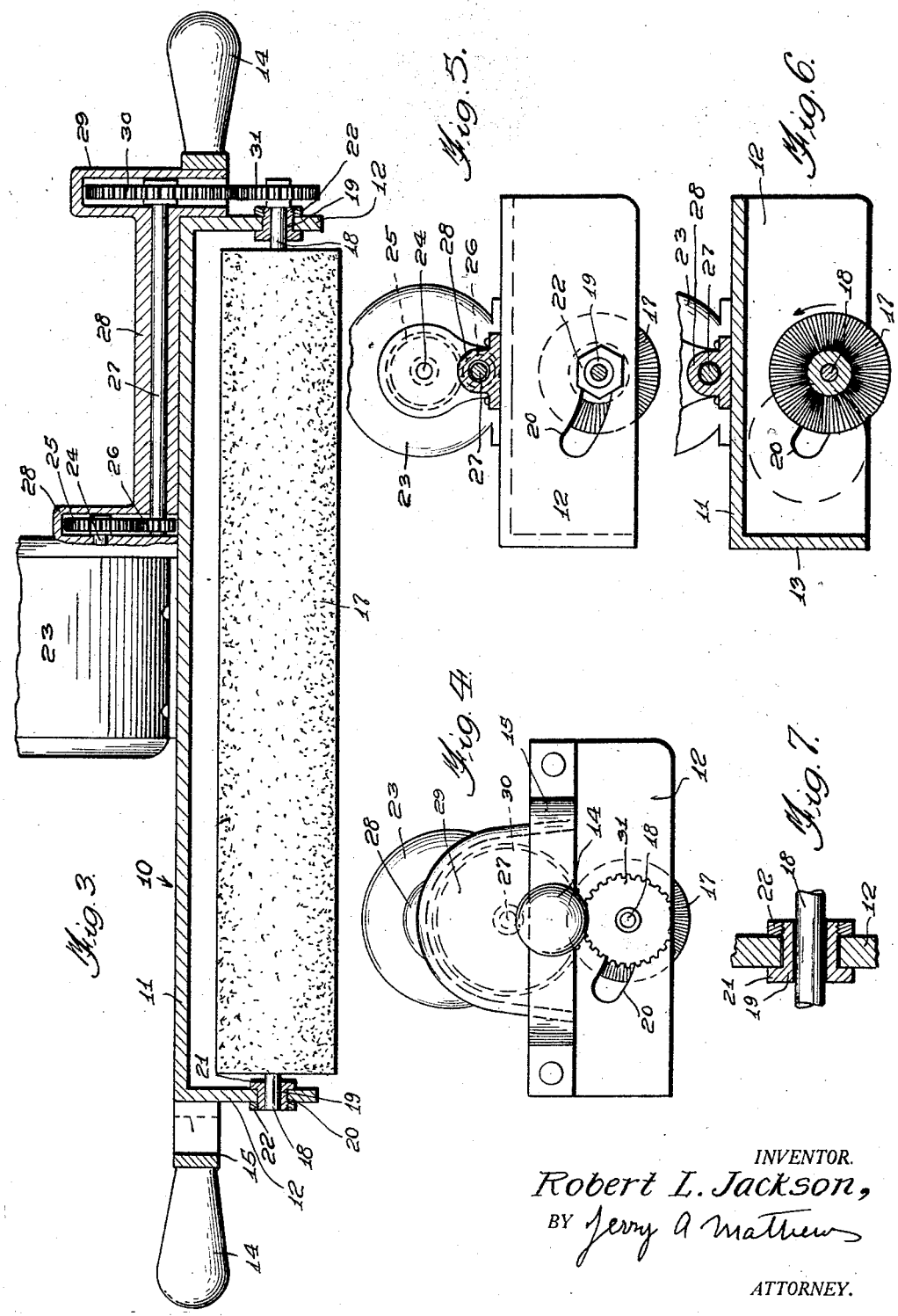
INVENTOR.
Robert L. Jackson,
BY Jerry A Mathews
ATTORNEY.

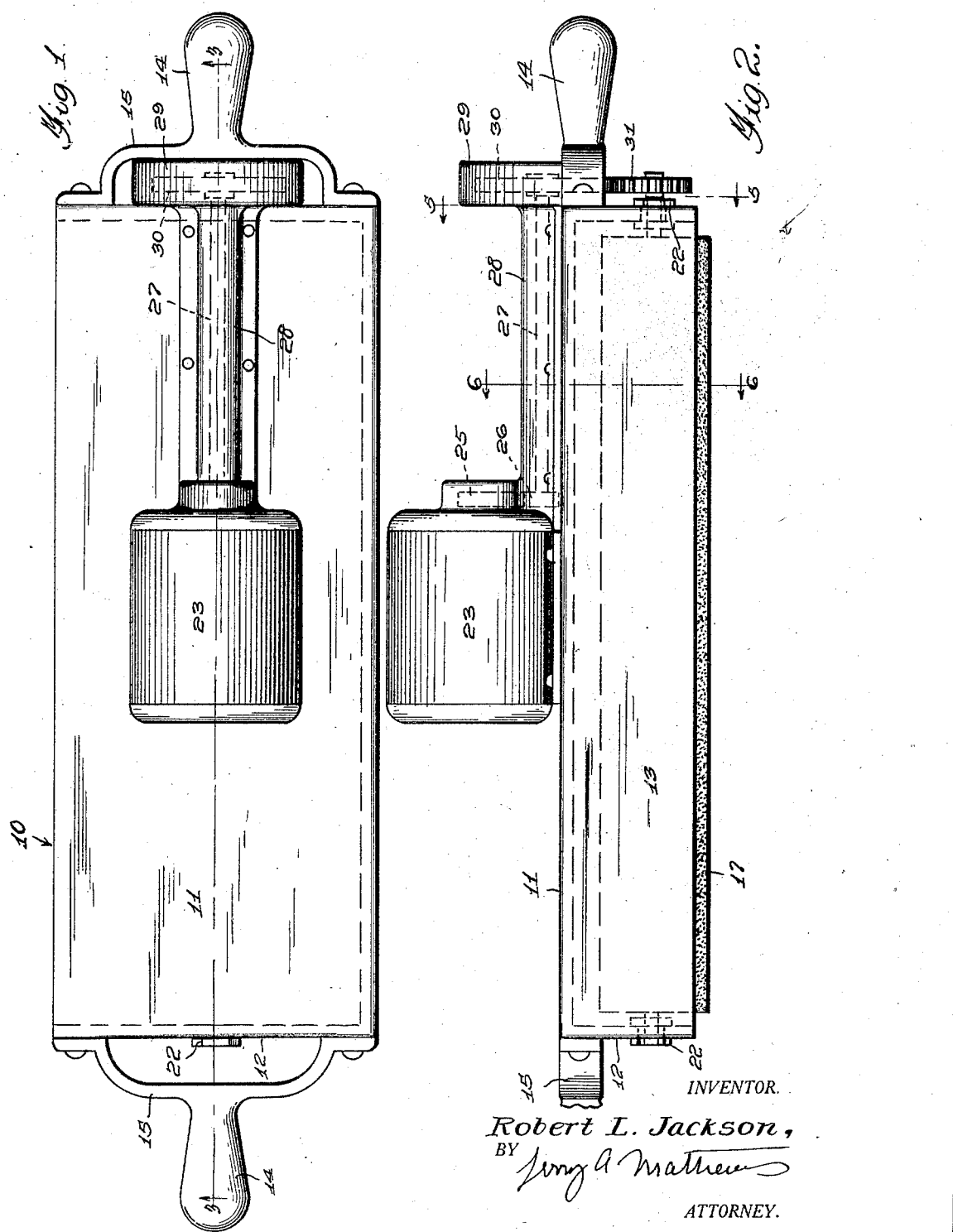

Patented Feb. 12, 1929.

1,702,007

UNITED STATES PATENT OFFICE.

ROBERT L. JACKSON, OF CLARKSBURG, WEST VIRGINIA, ASSIGNOR TO PHILIP GANGO, OF CLARKSBURG, WEST VIRGINIA.

POWER-DRIVEN BRUSH FOR MEAT BLOCKS.

Application filed June 14, 1927. Serial No. 198,843.

My invention relates to power driven rotary brushes.

In accordance with my invention, I provide a device which is designed to clean meat blocks. The device embodies a casing or body portion upon which is mounted a motor. A rotary brush is arranged within the casing or body portion to engage with the meat block and is driven by the motor. Handles are arranged at the ends of the body portion and the motor is preferably arranged centrally of the housing or body portion, and the device is, therefore, substantially balanced, for ease and convenience of manipulation. Means are also provided whereby the brush may be vertically adjusted with respect to the housing.

In the accompanying drawings, forming a part of this specification, and in which like numerals are employed to designate like parts throughout the same.

Figure 1 is a plan view of a brushing device embodying my invention,

Figure 2 is a side elevation of the same,

Figure 3 is a longitudinal section taken on line 3—3 of Figure 1, parts in elevation, Figure 4 is an elevation of one end of the device, Figure 5 is a transverse section taken on line 5—5 of Figure 2, Figure 6 is a similar view taken on line 6—6 of Figure 2, and, Figure 7 is a detailed section through one of the brush shaft bearings.

In the drawings, wherein for the purpose of illustration, is shown a preferred embodiment of my invention, the numeral 10 designates a housing or casing as a whole, embodying a top 11, ends 12, and a rear side 13, thus leaving the forward side and bottom of the housing open, as shown. The numeral 14 designates horizontally arranged handles, carried by U-shaped bases 15, which are rigidly attached to the ends 12 adjacent to the extremities of the same and adjacent to the top 11, while the handles 14 have their central longitudinal axes in alinement with the central longitudinal axis of the top 11. This provides the device with a low center of gravity, and a perfect balance of parts, during manipulation.

The numeral 17 designates a rotary brush, preferably embodying wire bristles. This rotary brush is rigidly mounted upon a brush shaft 18. This shaft has its ends journaled in bearings 19, positioned within segmental inclined slots 20, formed in the ends 12. The bearings 19 are provided upon their inner ends with flanges 21, while their outer ends are screw-threaded for receiving lock nuts 22. The bearings 19 may, therefore, be adjusted longitudinally within the segmental slots 20, and clamped to the ends 12 in selected adjusted positions, thereby regulating the elevation of the shaft 18 with respect to the housing 10.

Mounted upon the top 11 of the housing 10, and centrally thereof, is a motor 23, rigidly secured thereto by any suitable means. This motor has its armature shaft 24 extending longitudinally of the housing 10, and coinciding with the central longitudinal axis of the same. The armature shaft 24 is provided with a gear 25, rigidly secured thereto, and this gear drives a gear 26, rigidly mounted upon a longitudinal connecting shaft 27. The shaft 27 is journaled within a longitudinal housing 28, mounted upon the top 11, and rigidly attached thereto. The shaft 27 also coincides with the central longitudinal axis of the top 11. The gears 25 and 26 are preferably covered by a housing 28.

Formed upon the outer ends of the shaft housing 28 is a gear housing 29, receiving a gear 30, rigidly attached to the outer end of the shaft 27. This gear 30 is in permanent mesh with a gear 31, rigidly mounted upon one end of the shaft 18. The shaft 27 is at the central longitudinal axis of the top 11, as explained, and the segmental slot 20 is concentric with the shaft 27, inclined, and has its lower end in vertical alinement with the shaft 27. Hence when the brush shaft 18 is shifted to the inner ends of the slots 20, the brush is at the lowermost position, and may be raised by shifting the shaft 18 toward the outer ends of the curved slots 20.

In operation, the motor drives in a direction to turn the brush 17 counterclockwise, Figure 6, so that the lower portion of the brush is traveling forwardly. The rotating brush acting upon the surface of the block will, therefore, sweep the meat or the like forwardly through the open side of the housing 10, as the device is being advanced, by the operator engaging the handles 14. The arrangement is such that the parts of the device are well balanced, and the device may be manipulated with great ease.

It is to be understood that the form of my invention, herewith shown and described, is to be taken as a preferred example of the same, and that various changes in the shape, size and arrangement of parts may be resorted to without departing from the spirit of my invention, or the scope of the subjoined claim.

Having thus described my invention, I claim:—

A meat block cleaning device, comprising a casing having a top and depending ends, a motor mounted centrally upon the top of the casing, a drive shaft driven by the motor and arranged at one end of the motor and extending longitudinally of the casing and terminating adjacent to one end thereof, a rotary brush arranged within the casing and extending longitudinally thereof, a horizontal handle having a U-shaped base attached to that end of the casing adjacent to the outer end of the drive shaft, a gear housing mounted within the U-shaped base, a gear connected with the drive shaft and arranged within the gear housing, driving connecting means between said gear and the rotary brush, and a second horizontal handle attached to the opposite end of said casing.

In testimony whereof I affix my signature.

ROBERT L. JACKSON.